Aug. 9, 1960     J. C. BEGGS ET AL     2,948,475
AIRCRAFT AIR CONDITIONING SYSTEM
Filed Dec. 13, 1956     2 Sheets-Sheet 2

INVENTORS
JOHN C. BEGGS
HARVEY W. CARRIER
THOMAS P. FARKAS
BY Teller & McCormick
ATTORNEYS

United States Patent Office 2,948,475
Patented Aug. 9, 1960

2,948,475

AIRCRAFT AIR CONDITIONING SYSTEM

John C. Beggs, Manchester, Conn., Harvey W. Carrier, Springfield, Mass., and Thomas P. Farkas, Bloomfield, Conn., assignors to United Aircraft Corporation, East Hartford, Conn., a corporation of Delaware Filed Dec. 13, 1956, Ser. No. 628,032

11 Claims. (Cl. 236—13)

This invention relates to an aircraft air conditioning system of the type having a plurality of conduits carrying air at different temperatures for mixture in controlled proportion before introduction to or within a cabin or compartment where temperature controlled air is required.

It is a general object of the invention to provide an air conditioning system of the aforementioned type which is adapted to utilize the aircraft engine compressor as an air source at a minimum loss in engine output.

Another object of the invention is to provide air flow control means in the system which will operate more efficiently to effect temperature control than the means heretofore used in generally similar air conditioning systems.

A specific object of the invention is to provide a single operator for the flow control valves of a plurality of air conduits and to coordinate operation of the valves for the purpose of achieving precise temperature control without the usually encountered disadvantage of having such control entirely dependent upon the precision with which any one particular valve can be positioned or moved.

The drawings show a preferred embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

Figure 1:
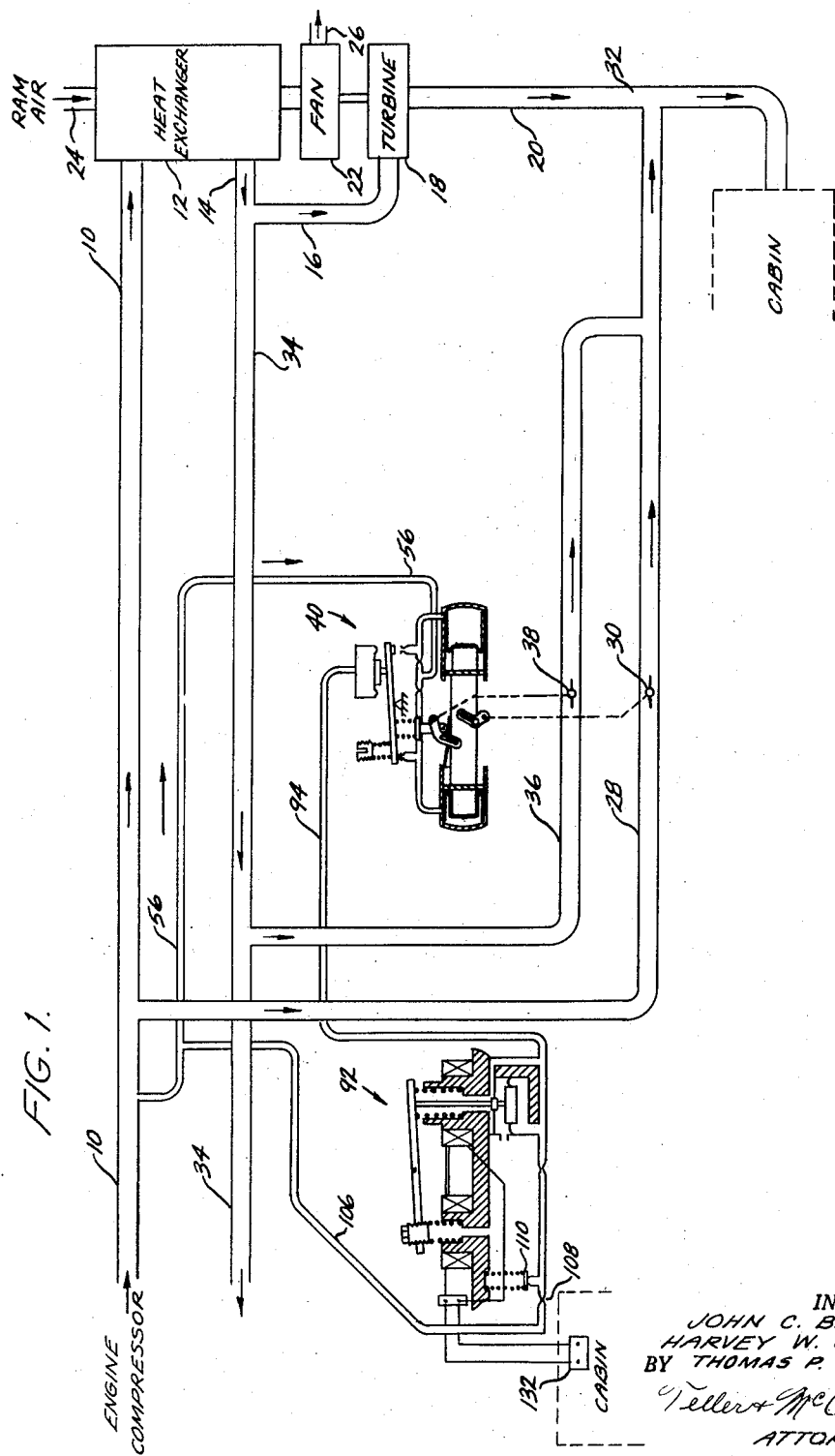
Fig. 1 is a schematic illustration of the air conditioning system including the aforementioned valve operator or actuator and a servo mechanism associated therewith.

It will be observed with reference to Fig. 1 of the drawings that the air conditioning system is of the type which supplies the aircraft cabin and/or other compartments of the aircraft with pressurized, temperature controlled air from a hot compressed air source such as the aircraft engine compressor. A system of this general type may include an inlet conduit 10 which is connectible to the engine compressor or to any other source of compressed air. The conduit 10 is connected with the inlet of a heat exchanger 12 wherein the air is initially cooled before it reaches the heat exchanger outlet 14. This initial or preliminary cooling of the air supply is generally insufficient for all purposes and operating conditions of an aircraft air conditioning system and, therefore, it is a conventional practice to cool the air further by the use of additional heat exchangers or by incorporating other devices in the system for the same purpose. One known technique involves connecting a conduit 16 with the heat exchanger outlet 14 which conduit is connected with the inlet of a turbine 18 whereby the air provides the propellant for the turbine. In propelling the turbine and in expanding therein, the air gives up heat before it is discharged from the turbine through a conduit 20. The air discharged from the turbine is relatively cold and the discharge conduit 20 when connected with an aircraft cabin or other compartment as shown may be referred to as the cold air supply conduit for the said cabin or compartment.

When a turbine is incorporated in the system in the aforedescribed manner, it may be used to advantage to drive a suction fan 22 which is arranged to draw air through the heat exchanger 12 from a ram air inlet 24. When the aircraft is in motion, air will be rammed through the heat exchanger 12 from the inlet 24 to the fan outlet 26 to cool the compressed air being passed therethrough. The fan provides the required coolant flow when the aircraft is not in motion or when ram air flow must be supplemented for efficient heat exchanger operation.

Obviously, all operating conditions will not dictate the need for just cold air at the cabin air inlet. In order that warm air can be introduced to the cabin, it is a conventional practice to provide a conduit 28 extending from the hot air inlet conduit 10 to the cold air conduit 20. It is customary to provide a throttle valve 30 in the hot air line 28 whereby to control the volume of hot air which flows to the cold air conduit 20 for mixture with cold air prior to introduction to the cabin. Preferably, the throttle valve 30 is movable between a fully closed position and a fully opened position. In some prior air conditioning systems of this general type, it has been found desirable to provide an additional throttle valve in the cold air conduit 20 on the upstream side of the section 32 thereof wherein the hot air and cold air are mixed.

As thus far described, the air conditioning system involves no invention, and it is a conventional practice to incorporate temperature responsive valve actuating means in a system as described to control the position of the throttle valve 30 in the hot air conduit 28. One disadvantage of the known air conditioning systems is that relatively hot air must be mixed with relatively cold air to provide a desired or selected resultant temperature in the mix. This places a heavy burden on the hot air throttle valve and dictates the need for exceptional accuracy in valve adjustment, because a relatively minor adjustment of the valve may effect a substantial change in the temperature of the mixture.

In accordance with the present invention, the aforesaid disadvantage is avoided by providing an additional supply of cabin air at an intermediate temperature and by providing coordinated valve operation for controlling flow from the hot air supply and from the intermediate temperature supply.

More specifically, a conduit 34 is connected with the heat exchanger outlet 14 to receive air therefrom at a temperature less than the temperature in the hot air conduit 10 and greater than the temperature in the cold air conduit 20. This conduit may hereinafter be referred to as the "warm" air conduit and at least part of the warm air flow therein may be used for purposes other than cabin supply. For example, the conduit 34 may be extended to a windshield de-fogging device (not shown), but in keeping with the present invention part of the warm air flow passes through a conduit 36 from the conduit 34 to the hot air conduit 28 on the downstream side of the throttle valve 30. Alternatively, the conduit 36 may be extended to the cold air conduit 20 at the mixing section 32 or it can be directly connected to the cabin at an independent inlet. A throttle valve 38 is disposed in the warm air conduit 36 similarly to the valve 30 in the hot air conduit 28 and is preferably movable between a fully closed position and a fully open position.

As indicated schematically in Fig. 1, the hot air throttle valve 30 and the warm air throttle valve 38 are operated by a single valve actuator indicated generally by the reference numeral 40. As will be described in greater detail hereinafter, the valve actuator 40 comprises a reciprocable fluid pressure operated motor and is constructed and arranged to move the throttle valves 30 and 38 between fully open positions and fully closed positions. The arrangement is such as to provide for relatively rapid closing movement of the hot air valve 30 while the warm air valve is closed more slowly and the arrangement further provides for substantial opening movement of the warm air valve 38 from a fully closed position before there is any opening movement of the hot air valve 30 from its fully closed position. Thus, under many operating conditions the hot air valve 30 may be fully closed and only the warm air valve 38 is adjusted through a plurality of positions to effect control and regulation of the temperature of the air mixture introduced to the cabin. Obviously, when warm air is being mixed with cold air while the hot air conduit is closed, a relatively minor adjustment of the warm air valve 38 will not be reflected in a substantial change in the temperature of the mixture introduced to the cabin. Accordingly, the aforementioned disadvantage of the conventional air conditioning system is avoided as will be more fully understood in connection with the following description of the valve actuator and the valve operation.

Figure 3:
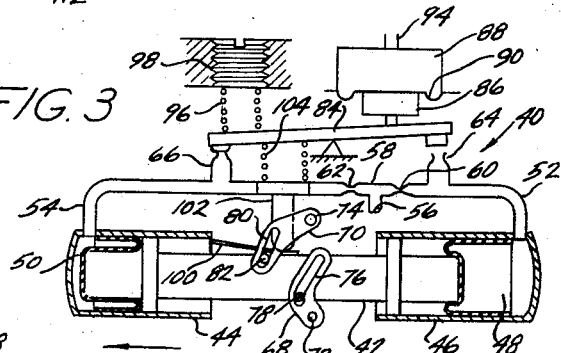
Fig. 3 is an enlarged schematic view of the valve actuator shown in its position wherein the valves it controls are fully open.
Figure 4:
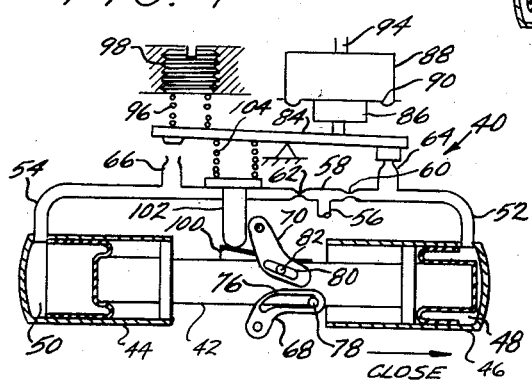
Fig. 4 is similar to Fig. 3, but the actuator is shown in its position wherein the valves are closed.

As best shown in Figs. 3 and 4, the valve actuator 40 includes a reciprocable piston 42 having its ends movable in the cylinders 44 and 46, respectively. The piston is moved toward the left or into the cylinder 44 when fluid pressure in a first working or head chamber 48 of the cylinder 46 is greater than the fluid pressure in a second working or head chamber 50 of the cylinder 44. The piston is moved toward the right when the pressure in the chamber 50 is greater than in the chamber 48. Fluid is introduced to the chambers 48 and 50 through the conduits 52 and 54, respectively, which are connected with a common supply conduit 56. More specifically, the supply conduit 56 bleeds air from the engine air compressor by communicating with the hot air conduit 10 and the conduit 56 communicates with a conduit 58 which is connected at its ends to the conduits 52 and 54, respectively, through restricted passages 60 and 62. While the air pressure in the supply conduit 56 will be subject to some variation with changes in engine operation, the restricted passages 60 and 62 diminish pressure fluctuation in the cylinder inlet conduits 52 and 54 respectively. A pressure differential in the said cylinder inlet conduits 52 and 54 is established by providing the said conduits with vent orifices 64 and 66, respectively, and by selectively varying the effective openings of the said orifices. As will be more fully described, means are provided for reducing the effective opening of the orifice 64 while enlarging the effective opening of the orifice 66 and vice versa. When the orifice opening 64 is reduced, pressure will increase in the cylinder inlet conduit 52 and in the cylinder chamber 48 while pressure is reduced in the cylinder inlet conduit 54 and in the cylinder chamber 50. This pressure differential causes the actuating piston 42 to be moved toward the left. When the effective opening of the orifice 66 is reduced while the opening of the orifice 64 is enlarged, there will be an increase in pressure in the cylinder chamber 50 and a decrease in pressure in the cylinder chamber 48, the pressure differential causing the actuator piston 42 to be moved toward the right.

It is a feature of construction in accordance with the present invention that the rectilinear movements of the actuator piston 42 are utilized to adjust the positions of the rotatable, butterfly type throttle valves 30 and 38. The motion transmitting means connected between the actuator piston and the said valves comprises a pair of cam operated cranks or levers 68 and 70. As schematically illustrated in Fig. 1, the cam lever 68 is secured to the shaft 72 of the hot air throttle valve 30 whereby pivotal movement of the said lever 68 will effect similar movement of the valve 30. The cam lever 70 is connected with the shaft 74 of the warm air throttle valve 38 whereby pivotal movement of the said lever 70 will effect similar movement of the said warm air throttle valve. Each of the cam levers 68 and 70 is generally L-shaped and each is provided with a suitable slot for receiving a cam pin secured to the actuator piston 42. The slot in the cam lever 68 is indicated by the reference 76 as receiving a cam pin 78, and the slot in the cam lever 70 is indicated by the reference 80 as receiving a cam pin 82. The levers 68 and 70 are connected to the throttle valves 30 and 38 so as to fully open the said throttle valves when the actuator piston 42 is in its extreme left-hand position and to fully close the throttle valves when the piston is in its extreme right-hand position. Thus, in movement of the actuator piston from left to right the throttle valves will be closed, and in movement of the piston from right to left, the throttle valves will be opened.

However, it is important to observe that the arrangement of the cam slots in the respective levers and the disposition of the respective cam pins cooperate to adapt the motion transmitting means for rapid movement of the hot air throttle valve 30 and more leisurely movement of the warm air throttle valve 38 and to provide for substantial opening movement of the said warm air throttle valve while the hot air throttle valve remains closed. That is, the slot 76 in the cam lever 68 for the hot air throttle valve receives its cam pin 78 on a relatively short moment arm from the valve shaft 72 in the "open" position of the actuator piston 42 and thus, closing movement of the hot air throttle valve will be relatively quick due to the relatively short moment arm. Such closing movement of the hot air throttle valve 30 is effected by clockwise pivotal movement of the cam lever 68 from the position shown in Fig. 3 to the position shown in Fig. 4. Such clockwise movement of the cam lever 68 is effected while the actuator piston 42 completes only a portion of its travel in the right-hand direction. In the remainder of travel in the said right-hand direction, the cam pin 78 merely moves in the horizontally disposed portion of the cam slot 76 as shown in Fig. 4, without causing any rotation of the throttle valve 30.

The cam lever 70 is pivoted counterclockwise by movement of the actuator piston in the right-hand direction and the said cam lever will be pivoted counterclockwise throughout the right-hand travel of the piston. Thus, the warm air throttle valve is moved from a fully open position to a fully closed position only when the actuator piston completes its travel in the right-hand direction.

When the actuator piston is moved from right to left, the cam lever 70 will immediately start to move in a clockwise direction to start opening movement of the warm air throttle valve 38. However, the initial left-hand movement of the piston 42 will not effect rotation of the cam lever 68 because the cam pin 78 is disposed in the horizontal portion of the cam slot 76. However, after approximately half of the left-hand piston travel has been completed, the cam pin 78 will engage the oblique portion of the cam slot 76 to start counterclockwise or opening movement of the hot air throttle valve 30. Due to the relatively short moment arm, the opening movement of the hot air valve will be relatively quick as compared to the opening movement of the warm air throttle valve whereby both valves will be fully opened when the right to left-hand piston travel is completed.

In summary, right-hand movement of the actuator piston 42 from its extreme left-hand position will result in relatively rapid closing movement of the hot air throttle valve and relatively slow closing movement of the warm air throttle valve, the hot air throttle valve being closed before the warm air throttle valve is fully closed. In movement of the actuator piston from right to left from the extreme right-hand position, there will be relatively slow opening movement of the warm air throttle valve for the first portion of travel without any accompanying opening movement of the hot air valve. At an intermediate point in the left-hand travel, the hot air valve will start to open at a relatively rapid rate so that both valves will be fully opened when right to left travel is completed.

Turning now to the means for selectively reducing and enlarging the effective openings in the orifices 64 and 66, it will be seen that the said means includes an arm 84 which is pivotally supported between its ends and which has means on its respective ends engageable with and movable relative to the orifices 64 and 66. That is, the arm 84 can be pivoted counterclockwise to the position shown in Fig. 3 whereby to close the orifice 66 and to fully open the orifice 64. When the arm 84 is pivoted clockwise to the position shown in Fig. 4, the orifice 64 will be closed and the orifice 66 fully opened. In Fig. 3 wherein the valve actuator piston 42 is shown positioned in its extreme left-hand position (the throttle valves fully open), the orifice control arm 84 is shown disposed to close the orifice 66 and to open the orifice 64 which will increase the pressure in the cylinder chamber 50 and decrease the pressure in the cylinder chamber 48 whereby the valve actuator is conditioned to start movement from left to right. In Fig. 4 wherein the actuator piston 42 is in its right-hand position (the throttle valves fully closed), the orifice control arm 84 is shown closing the orifice 64 and opening the orifice 66 whereby to condition the actuator for movement of the piston from right to left.

The arm 84 is biased clockwise by fluid pressure operated means which comprises a piston 86 engaging the end portion of the said arm adjacent the orifice 64, the piston being movable in a chamber 88 responsive to fluid pressure therein on a diaphragm 90. Air under pressure which changes with operation of a servo mechanism 92 is introduced to the chamber 88 through a conduit 94. The arm is biased counterclockwise by a spring 96 engaging the end portion of the said arm adjacent the orifice 66, the spring being disposed against a seat 98 which is manually adjustable to adjust the spring force.

Obviously, with an increase in pressure in the chamber 88, the arm 84 will move clockwise to restrict the orifice 64 while enlarging the orifice 66 whereby to cause right-to-left movement of the actuator piston 42 and opening movement of the throttle valves. With a decrease in pressure in the servo chamber 88, the arm 84 will move counterclockwise to restrict the orifice 66 while enlarging the orifice 64 whereby to cause left-to-right movement of the actuator and closing movement of the throttle valves.

It will also be obvious that a change in servo pressure in the chamber 88 resulting in a pressure differential in the actuating chambers 48 and 50 will cause the piston 42 to move in one direction or the other for the full extent of its travel unless there is a reverse change in servo pressure or unless some other means influences the position of the arm 84 and thus the pressure differential in the actuator chambers. It is not desirable to move the piston 42 the full extent of its travel for each change in the servo pressure signal because this would result in full closing or opening movement of the throttle valves which may be more valve movement than is required for temperature correction. To avoid this undesirable result, feedback means is incorporated in the valve actuator construction to diminish or to counteract the servo pressure movement of the arm 84.

The said feedback means comprises a sloping cam 100 fixed to the actuator piston 42 and engaged by a follower 102 which engages and thrusts a spring 104 against the arm 84 to bias it clockwise. The sloping cam 100 is arranged on the piston 42 so that clockwise bias on the arm 84 will be increased in right-hand movement of the piston which, as previously described, is instituted by counterclockwise movement of the said arm. Clockwise bias on the arm 84 will be decreased in left-hand movement of the piston 42 which is instituted by clockwise movement of the said arm. Thus, the feedback means diminishes and counteracts servo pressure signal movement of the orifice control arm 84 and by so doing it diminishes the signal responsive movement of the actuator piston 42 and diminishes valve movement to avoid over-correction and undue valve fluctuation.

Figure 2:
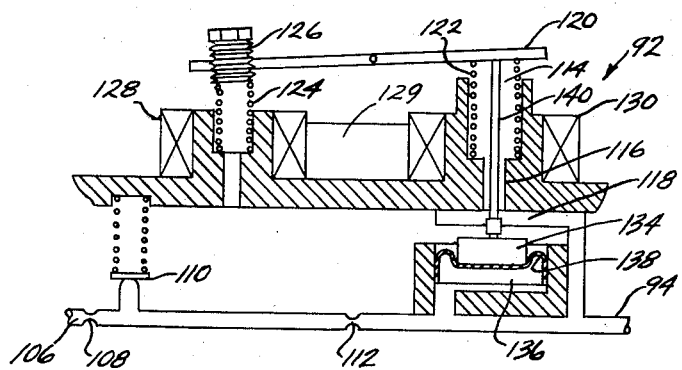
Fig. 2 is an enlarged schematic view of the servo mechanism.

As previously mentioned, the pressure in the chamber 88 is varied by operation of the servo mechanism 92. The servo unit includes a conduit 106 which is connected to the compressed air bleed conduit 56 and also connected to the servo chamber supply conduit 94. The conduit 106 includes a first restriction 108 for diminishing pressure surges and a relief valve 110 for setting the upper limit of pressure in the servo conduit and a second restriction 112 downstream of the relief valve for further diminishing pressure surges. As best shown in Fig. 2, a vent 114 communicates with the servo conduit 94 through passages 116 and 118, and a pivotally supported solenoid operated armature 120 is movable relative to the vent to vary the effective opening thereof. The armature 120 is pivoted between its ends, the end adjacent the vent 114 being biased away from the vent (counterclockwise) by a spring 122. A second spring 124 engages an adjustable seat 126 on the other end of the armature and biases the armature clockwise or toward the vent. Obviously, the springs 122 and 124 act against each other to place the armature in one pivoted position with respect to the vent. The armature is moved from the said one position by the magnetic influence of a pair of cooperating solenoid coils 128 and 130 and a permanent magnet 129 disposed therebetween.

The coils 128 and 130 are connected by suitable electrical conductors with a temperature sensitive unit 132 in the aircraft cabin which varies the electromagnetic flux in response to temperature change in the cabin. The particular construction of the thermostat or temperature sensor 132 forms no part of the present invention and will not be covered here, but preferably, the unit should be adjustable to select a desired temperature level which is to be maintained by throttle valve movement as controlled by the said temperature sensor. In any form provided, the temperature sensing unit should be adapted to increase the net flux at the pole on which the coil 128 is mounted while decreasing the net flux at the pole of the coil 130 a proportionate amount responsive to an increase in cabin temperature, and to decrease the net flux at the pole of the coil 128 while increasing the net flux at the pole of the coil 130 a proportionate amount responsive to a decrease in cabin temperature.

In the first case, where cabin temperature increases beyond the temperature selected and the magnetic influence adjacent the coil 128 is increased while the influence adjacent the coil 130 is decreased, the armature 120 will be moved counterclockwise to increase the effective opening of the vent 114 and thus to decrease the pressure in the servo conduit 94 and the servo chamber 88 of the actuator 40. This will cause the orifice 64 to be enlarged and the orifice 66 to be reduced, thus creating an actuator pressure differential where the pressure in chamber 50 is greater than the pressure in chamber 48. This will cause the actuator to move toward the right to effect closing movement of the throttle valves in the warm and hot air conduits whereby cabin temperature will be decreased due to the greater proportion of cold air being introduced thereto.

In the second case, where cabin temperature falls below the selected level and the magnetic influence adjacent the coil 128 is decreased while the influence adjacent the coil 130 is increased, the armature 120 will be moved clockwise to decrease the effective opening of the vent 114 and thus to increase the servo pressure in the servo conduit 94 and servo chamber 88. This will cause the orifice 64 to be reduced and the orifice 66 to be enlarged, thereby creating an actuator pressure differential where the pressure in chamber 48 is greater than the pressure in chamber 50. This will cause the actuator piston to move toward the left to effect opening movement of the throttle valves in the warm and hot air conduits whereby cabin temperature will be increased due to the greater proportion of warm and hot air being introduced to the cabin.

Similarly to the actuator 40, the servo mechanism 92 has a feedback to avoid over-correction for temperature change. The servo feedback includes a piston 134 which is reciprocable in a chamber 136 responsive to fluid pressure acting on a diaphragm 138. The chamber 136 communicates with the servo conduit 94 and the piston 134 has a rod 140 connected with the armature 120 adjacent the vent 114 and is arranged so that servo pressure acting on the piston tends to open the vent. Accordingly, when the armature is moved to reduce the vent and thereby to increase servo pressure, the increased servo pressure increases the bias on the armature tending to enlarge the vent. And when the armature is moved to enlarge the vent and thereby to reduce servo pressure, the bias on the armature tending to enlarge the vent is reduced. Thus, in operation of the air conditioning system, there are two feedbacks provided, one being a servo feedback and the other an actuator feedback, which cooperate to prevent excessive valve movement and fluctuation.

For purposes of briefly reviewing the operation of the system, let it be assumed that the desired cabin temperature is 70° F. and the thermostat or temperature sensing unit 132 is adjusted for regulation of cabin temperature to that figure. Now, assuming that the temperature rises to 80° F. (for example), the solenoid signal caused by the temperature increase will pivot the servo armature 120 counterclockwise to enlarge the effective opening of the vent 114 whereby to decrease the servo pressure signal. However, the servo feedback operates as previously described to prevent undue counterclockwise movement of the armature and to prevent excessive reduction in the servo pressure signal. The reduced servo pressure in the servo chamber 88 causes counterclockwise pivoting movement of the orifice control arm 84 which, as previously described, brings about left-to-right movement of the actuator piston 42 and closing movement of the throttle valves. However, the actuator feedback operates as described to diminish such actuator and valve movement whereby to prevent over-correction which would unduly reduce the cabin temperature.

If the cabin temperature should fall to 60° F. (for example), the solenoid signal caused by the temperature reduction moves the armature 120 clockwise to increase the servo pressure signal, but the servo feedback modifies the pressure increase. The increased servo pressure moves the orifice control arm clockwise to bring about right-to-left armature movement and opening movement of the throttle valves. Here again the actuator feedback prevents over-adjustment of the valves and consequent over-correction which would unduly increase cabin temperature.

In the course of operation of the air conditioning system under most anticipated temperature conditions, it will not be necessary to move the hot air throttle valve 30 from the closed position. That is, the heat exchanger 12 and turbine 18 are designed or selected to provide warm air and cold air in the conduits 36 and 20 at temperatures which will provide a desired cabin temperature by mixture without hot air under most anticipated flight conditions. Thus, with the conduit arrangement shown, the drain on the engine compressor supply is minimized. However, when extraordinary conditions prevail dictating the need for hot air in the mixture, the system operates automatically to provide the hot air necessary to maintain the selected cabin temperature.

It is an important but not readily apparent feature of the present invention that the actuator 40 is double acting. That is, there is an advantage in having the actuator piston 42 reciprocable as a result of a differential in the pressure in the two actuating chambers 48 and 50. This makes it possible to achieve the necessary actuator output with a relatively low servo pressure since actuator operation depends more upon pressure differential than upon inlet or servo pressure. The inlet pressure would be more controlling if the actuator piston were movable responsive to fluid pressure in one direction only and returned by a fixed force spring. In the form of actuator provided, there can be substantial variation in the inlet or servo pressure without adverse effects on the actuator operation.

Further in this connection, it should be observed that with the fully fluid pressure responsive double acting solenoid, a relatively large force output is provided under minimum pressure supply conditions. That is, the pressure in one actuator chamber can be reduced substantially to zero while the other chamber has fluid at the minimum supply pressure. Thus, full effect and force can be obtained from available pressure. In the older known type actuators where the actuating piston is urged in one direction by a spring, the force output responsive to fluid pressure cannot be as great because the spring force cannot be reduced substantially to zero.

The invention claimed is:

1. In an aircraft air conditioning system of the type having a plurality of conduits carrying air under pressure at different temperatures for mixture in selected proportion to supply a compartment with air at controlled temperature, the combination comprising a throttle valve in one of the conduits, a valve actuator including a piston and means defining a fluid chamber around each end of the piston whereby the piston can be reciprocated by establishing an alternating pressure differential between the chambers, motion transmitting means connected between the piston and the valve to open and close the valve responsive to piston reciprocation, the said chambers being adapted for connection to a common source of fluid under pressure and each chamber having means defining an outlet orifice, reciprocable means for restricting one orifice while opening the other and vice versa whereby to establish a pressure differential between the chambers, means biasing the reciprocable means in one direction, fluid pressure responsive means biasing the reciprocable means in the opposite direction, a servo conduit connected with the pressure responsive means and connectible with a source of fluid under pressure and having a vent, and means operable in response to temperature increase and decrease to change the effective size of said vent and thereby to change the fluid pressure in said servo conduit and in said pressure responsive means.

2. In an aircraft air conditioning system of the type having a plurality of conduits carrying air under pressure at different temperatures for mixture in selected proportion to supply a compartment with air at controlled temperature, the combination comprising a throttle valve in one of the conduits, a valve actuator including a piston and means defining a fluid chamber around each end of the piston whereby the piston can be reciprocated by establishing an alternating pressure differential between the chambers, motion transmitting means connected between the piston and the valve to open and close the valve responsive to piston reciprocation, the said chambers being adapted for connection to a common source of fluid under pressure and each chamber having means defining an outlet orifice, a pivotally supported arm movable in one direction to restrict one orifice while opening the other and movable in the opposite direction to restrict said other orifice while opening said one orifice whereby to establish an alternating pressure differential between the chambers, resilient means biasing said arm in said one direction, fluid pressure responsive means biasing the arm in said opposite direction, a servo conduit connected with the pressure responsive means and connectible with a source of fluid under pressure and having a vent, and means operable in response to temperature change to vary the effective opening of said vent and thereby to vary the fluid pressure in said servo conduit and in said pressure responsive means.

3. In an aircraft air conditioning system of the type having a plurality of conduits carrying air under pressure at different temperatures for mixture in selected proportion to supply a compartment with air at controlled temperature, the combination comprising a throttle valve in one of the conduits, a valve actuator including a piston and means defining a fluid chamber around each end of the piston whereby the piston can be reciprocated by establishing an alternating pressure differential between the chambers, motion transmitting means connected between the piston and the valve to open and close the valve responsive to piston reciprocation, the said chambers being adapted for connection to a common source of fluid under pressure and each chamber having means defining an outlet orifice, reciprocable means for restricting one orifice while opening the other and vice versa whereby to establish a pressure differential between the chambers, means biasing the reciprocable means in one direction, fluid pressure responsive means biasing the reciprocable means in the opposite direction, a servo conduit connected with the pressure responsive means and connectible with a source of fluid under pressure and having a vent, and means for varying the effective opening of said vent whereby to vary the fluid pressure in said servo conduit and in said pressure responsive means, said means comprising a pivotally supported armature which is movable in one direction to reduce the vent opening, resilient means biasing the armature in the opposite direction, and a variable strength solenoid which varies responsive to temperature change in said compartment urging said armature in said one direction.

4. In an aircraft air conditioning system of the type having a plurality of conduits carrying air under pressure at different temperatures for mixture in selected proportion to supply a compartment with air at controlled temperature, the combination comprising a throttle valve in one of the conduits, a valve actuator including a piston and means defining a fluid chamber around each end of the piston whereby the piston can be reciprocated by establishing an alternating pressure differential between the chambers, motion transmitting means connected between the piston and the valve to open and close the valve responsive to piston reciprocation, the said chambers being adapted for connection to a common source of fluid under pressure and each chamber having means defining an outlet orifice, a pivotally supported arm movable in one direction to restrict one orifice while opening the other and movable in the opposite direction to restrict said other orifice while opening said one orifice whereby to establish an alternating pressure differential between the chambers, resilient means biasing said arm in said one direction, fluid pressure responsive means biasing the arm in said opposite direction, a servo conduit connected with the pressure responsive means and connectible with a source of fluid under pressure and having a vent, and means for varying the effective opening of said vent whereby to vary the fluid pressure in said servo conduit and in said pressure responsive means, said means comprising a pivotally supported armature which is movable in one direction to reduce the vent opening, resilient means biasing the armature in the opposite direction, and a variable strength solenoid which varies responsive to temperature change in said compartment urging said armature in said one direction.

5. In an aircraft air conditioning system of the type having a plurality of conduits carrying air under pressure at different temperatures for mixture in selected proportion to supply a compartment with air at controlled temperature, the combination comprising a throttle valve in one of the conduits, a valve actuator including a piston and means defining a fluid chamber around each end of the piston whereby the piston can be reciprocated by establishing an alternating pressure differential between the chambers, motion transmitting means connected between the piston and the valve to open and close the valve responsive to piston reciprocation, the said chambers being adapted for connection to a common source of fluid under pressure and each chamber having means defining an outlet orifice, a pivotally supported arm movable in one direction to restrict one orifice while opening the other and movable in the opposite direction to restrict said other orifice while opening said one orifice whereby to establish an alternating pressure differential between the chambers, resilient means biasing said arm in said one direction, fluid pressure responsive means biasing the arm in said opposite direction, feedback means for said actuator comprising a cam fixed to said piston, a follower engageable by said cam, a spring disposed between said follower and arm to bias the arm in said opposite direction, the cam being arranged to move said follower toward the arm when said piston is moved in one direction due to a pressure differential caused by moving said arm in its said one direction, a servo conduit connected with the pressure responsive means and connectible with a source of fluid under pressure and having a vent, and means operable in response to temperature change to vary the effective opening of said vent and thereby to vary the fluid pressure in said servo conduit and in said pressure responsive means.

6. In an aircraft air conditioning system of the type having a plurality of conduits carrying air under pressure at different temperatures for mixture in selected proportion to supply a compartment with air at controlled temperature, the combination comprising a throttle valve in one of the conduits, a valve actuator including a piston and means defining a fluid chamber around each end of the piston whereby the piston can be reciprocated by establishing an alternating pressure differential between the chambers, motion transmitting means connected between the piston and the valve to open and close the valve responsive to piston reciprocation, the said chambers being adapted for connection to a common source of fluid under pressure and each chamber having means defining an outlet orifice, a pivotally supported arm movable in one direction to restrict one orifice while opening the other and movable in the opposite direction to restrict said other orifice while opening said one orifice whereby to establish an alternating pressure differential between the chambers, resilient means biasing said arm in said one direction, fluid pressure responsive means biasing the arm in said opposite direction, feedback means for said actuator comprising a cam fixed to said piston, a follower engageable by said cam, a spring disposed between said follower and arm to bias the arm in said opposite direction, the cam being arranged to move said follower toward the arm when said piston is moved in one direction due to a pressure differential caused by moving said arm in its said one direction, a servo conduit connected with the pressure responsive means and connectible with a source of fluid under pressure and having a vent, and means for varying the effective opening of said vent whereby to vary the fluid pressure in said servo conduit and in said pressure responsive means, said means comprising a pivotally supported armature which is movable in one direction to reduce the vent opening, resilient means biasing the armature in the opposite direction, a variable strength solenoid which varies responsive to temperature change in said compartment urging said armature in said one direction, and means biased by fluid pressure in said servo conduit connected with said armature and urging the same in said opposite direction.

7. Temperature control means for an aircraft air conditioning system of the type having a plurality of conduits carrying air under pressure at different temperatures for mixture in controlled proportion to regulate air temperature in a compartment, the said temperature control means comprising a pair of rotatable throttle valves disposed respectively in a pair of the conduits, valve operating means including a reciprocable piston, means for moving the piston in one direction responsive to increased temperature in the compartment and for moving the piston in the opposite direction responsive to decreased temperature in the compartment, and motion transmitting means interconnecting said valves and the piston and including a first cam lever connected with one valve, a first cam pin on said piston engaging said first lever to close said one valve during only a portion of piston travel in its said one direction and to fully open said one valve during only a portion of piston travel in its said opposite direction, a second cam lever connected with the other valve, a second cam pin on said piston engaging said second lever to close said other valve by full piston travel in its said one direction and to fully open said other valve by full piston travel in its said opposite direction.

8. Temperature control means for an aircraft air conditioning system as defined in claim 7 wherein said one valve is disposed in a conduit carrying hot air and wherein said other valve is disposed in a conduit carrying warm air and wherein another of the conduits carries cold air.

9. Temperature control means for an aircraft air conditioning system as defined in claim 7 wherein said one valve is disposed in a hot air conduit, said other valve is disposed in a warm air conduit, and wherein another conduit carries cold air, and further defined by an arrangement of said cam levers and pins wherein the said other valve is opened substantially while said one valve remains closed during travel of said piston in its said opposite direction from a position wherein both of said valves are closed.

10. Means for controlling flow in a conduit and comprising in combination, a throttle valve in the conduit, a valve actuator comprising a reciprocable fluid pressure operated motor having a pair of working chambers and adapted for reciprocation by establishing an alternating pressure differential between the chambers, motion transmitting means connecting the motor and the valve to open and to close the valve as a result of motor reciprocation, the said chambers being adapted for connection to a source of fluid under pressure and each chamber having means defining an outlet orifice, a pivotally supported arm movable in one direction to restrict one orifice while opening the other and movable in the opposite direction to restrict said other orifice while opening said one orifice whereby to establish an alternating pressure differential between the chambers, resilient means biasing said arm in said one direction, fluid pressure responsive means biasing the arm in said opposite direction, control means for controlling the fluid pressure in said last mentioned means whereby selectively to pivot said arm, and feedback means for said actuator including resilient means engaging said arm to bias the same in said opposite direction and also including means for increasing the effective force of said resilient means on said arm and for decreasing the effective force thereof respectively due to movement of said motor in one direction caused by moving said arm in said one direction and movement of said motor in an opposite direction caused by moving said arm in its said opposite direction.

11. Means for controlling flow in a conduit and comprising in combination, a throttle valve in the conduit, a valve actuator including piston means and means defining a fluid chamber around each end of the piston means whereby the piston means can be reciprocated by establishing an alternating pressure differential between the chambers, motion transmitting means connected between the piston means and the valve to open and close the valve responsive to reciprocation of the piston means, the said chambers being adapted for connection to a source of fluid under pressure and each chamber having means defining an outlet orifice, a pivotally supported arm movable in one direction to restrict one orifice while opening the other and movable in the opposite direction to restrict said other orifice while opening said one orifice whereby to establish an alternating pressure differential between the chambers, resilient means biasing said arm in said one direction, fluid pressure responsive means biasing the arm in said opposite direction, means for controlling the fluid pressure in said last mentioned means, and feedback means for said actuator comprising a cam fixed to said piston means, a follower engageable by said cam, a spring disposed between said follower and arm to bias the arm in said opposite direction, the cam being arranged to move said follower toward the arm when said piston means is moved in one direction due to a pressure differential caused by moving said arm in its said one direction, and said cam being arranged to move said follower away from said arm when said piston means is moved in an opposite direction due to a pressure differential caused by moving said arm in its said opposite direction.

References Cited in the file of this patent

UNITED STATES PATENTS

| 2,106,036 | O'Connor | Jan. 18, 1938 |
| 2,142,665 | Brett et al. | Jan. 3, 1939 |
| 2,620,983 | Lyman | Dec. 9, 1952 |
| 2,630,132 | Hughes | Mar. 3, 1953 |
| 2,729,429 | Goemann | Jan. 3, 1956 |
| 2,792,019 | Lieser | May 14, 1957 |
| 2,835,265 | Brandstadter | May 20, 1958 |
| 2,854,913 | Brahm | Oct. 7, 1958 |

FOREIGN PATENTS

| 440,342 | Great Britain | Dec. 20, 1935 |
| 859,350 | France | June 3, 1940 |